United States Patent
Attfield

(10) Patent No.: US 11,425,168 B2
(45) Date of Patent: Aug. 23, 2022

(54) SYSTEM AND METHODS FOR FACILITATING SECURE COMPUTING DEVICE CONTROL AND OPERATION

(71) Applicant: Sequitur Labs, Inc., Issaquah, WA (US)

(72) Inventor: Philip Attfield, Fall City, WA (US)

(*) Notice: Subject to any disclaimer, the term of this patent is extended or adjusted under 35 U.S.C. 154(b) by 780 days.

(21) Appl. No.: 15/573,815

(22) PCT Filed: May 13, 2016

(86) PCT No.: PCT/US2016/032502
§ 371 (c)(1),
(2) Date: Nov. 13, 2017

(87) PCT Pub. No.: WO2016/183504
PCT Pub. Date: Nov. 17, 2016

(65) Prior Publication Data
US 2018/0262532 A1    Sep. 13, 2018

Related U.S. Application Data

(60) Provisional application No. 62/161,614, filed on May 14, 2015.

(51) Int. Cl.
*H04L 29/06* (2006.01)
*H04L 9/40* (2022.01)
(Continued)

(52) U.S. Cl.
CPC ............ *H04L 63/20* (2013.01); *H04L 9/3247* (2013.01); *H04L 63/0428* (2013.01);
(Continued)

(58) Field of Classification Search
CPC ... H04L 63/20; H04L 9/3247; H04L 63/0428; H04L 63/102; H04L 63/123
See application file for complete search history.

(56) References Cited

U.S. PATENT DOCUMENTS 5,881,225 A    3/1999    Worth
7,140,035 B1   11/2006   Karch
(Continued)

FOREIGN PATENT DOCUMENTS

EP    1339199         8/2003
EP    2985728 A1 *    2/2016    ............. G06Q 30/00
(Continued)

OTHER PUBLICATIONS

"Computer Architecture: A Quantitative Approach", Hennessy J. and Patterson, D., 5th Ed. Morgan Kaufman (2011).
(Continued)

*Primary Examiner* — Matthew Smithers
*Assistant Examiner* — Shu Chun Gao
(74) *Attorney, Agent, or Firm* — JRG Attorneys at Law

(57) ABSTRACT

A system and methods for facilitating secure computing device control and operation. The invention discloses a framework to supply security and policy-based control to computing applications as a software service. Clients running the framework make requests for services whereby they identify the service needed and its required parameters, encrypt and sign them, and send them to the service handler. The service handler decrypts, checks for policy allowance, and then, if allowed, executes the functions. The handler then encrypts and returns the response to the client. The framework allows for an aggregator that collects service requests for any number of clients and manages the distribution to service handlers and communications back to the clients.

15 Claims, 3 Drawing Sheets

(51) Int. Cl.
*H04L 9/32* (2006.01)
*H04L 67/51* (2022.01)

(52) U.S. Cl.
CPC .......... *H04L 63/102* (2013.01); *H04L 63/123* (2013.01); *H04L 67/16* (2013.01)

(56) References Cited

U.S. PATENT DOCUMENTS

| | | | |
|---|---|---|---|
| 7,240,015 B1 | 6/2007 | Karmouch | |
| 7,246,233 B2 | 7/2007 | Brabson et al. | |
| 7,400,891 B2 | 7/2008 | Aaron | |
| 7,640,429 B2 | 12/2009 | Huang et al. | |
| 7,797,544 B2 | 9/2010 | Dillaway | |
| 7,941,647 B2 | 5/2011 | Yates | |
| 8,014,721 B2 | 9/2011 | Johnson | |
| 8,037,318 B2 | 10/2011 | Tahan | |
| 8,127,982 B1 | 3/2012 | Casey et al. | |
| 8,135,385 B2 | 3/2012 | Ohta | |
| 8,176,336 B1 | 5/2012 | Mao | |
| 8,185,959 B2 | 5/2012 | Bellwood | |
| 8,230,399 B2 | 7/2012 | Vertes | |
| 8,285,249 B2 | 10/2012 | Baker et al. | |
| 8,321,498 B2 | 11/2012 | Maes | |
| 8,463,819 B2 | 6/2013 | Shashikumar et al. | |
| 8,468,586 B2 | 6/2013 | Kootayi et al. | |
| 8,468,608 B1 | 6/2013 | Hernacki | |
| 8,538,843 B2 | 9/2013 | Smith | |
| 8,922,372 B2 | 1/2014 | Softer | |
| 8,688,592 B1 | 4/2014 | Abramson | |
| 8,880,047 B2 | 11/2014 | Konicek | |
| 8,904,483 B1 | 12/2014 | Martini | |
| 9,053,456 B2 | 6/2015 | Verthein | |
| 9,391,782 B1 | 7/2016 | Mironenko | |
| 9,411,962 B2 | 8/2016 | Attfield | |
| 2001/0002485 A1* | 5/2001 | Bisbee | G07F 7/12 713/167 |
| 2002/0101826 A1 | 8/2002 | Giacopelli | |
| 2002/0138814 A1 | 9/2002 | Katayama | |
| 2003/0125925 A1 | 7/2003 | Walther | |
| 2004/0123139 A1 | 6/2004 | Aiello | |
| 2004/0123153 A1 | 6/2004 | Wright | |
| 2004/0204949 A1 | 10/2004 | Shaji | |
| 2005/0132202 A1 | 6/2005 | Billaway | |
| 2005/0193196 A1 | 9/2005 | Huang | |
| 2006/0005239 A1 | 1/2006 | Mondri | |
| 2006/0026548 A1 | 2/2006 | Rosener | |
| 2006/0059565 A1 | 3/2006 | Green | |
| 2006/0150256 A1* | 7/2006 | Fanton | H04L 9/32 726/27 |
| 2006/0236369 A1 | 10/2006 | Covington | |
| 2006/0236385 A1 | 10/2006 | Innes | |
| 2007/0150559 A1 | 6/2007 | Smith | |
| 2008/0085698 A1 | 4/2008 | Gamm | |
| 2008/0133914 A1 | 6/2008 | Isaacson | |
| 2008/0184336 A1 | 7/2008 | Sarukkai | |
| 2008/0194233 A1 | 8/2008 | Henry | |
| 2009/0031141 A1 | 1/2009 | Pearson | |
| 2009/0089125 A1 | 4/2009 | Sultan | |
| 2009/0100269 A1 | 4/2009 | Naccache | |
| 2009/0193503 A1 | 7/2009 | Shevohenko | |
| 2009/0198617 A1 | 8/2009 | Soghoian | |
| 2009/0204785 A1 | 8/2009 | Yates, Jr. et al. | |
| 2009/0205016 A1 | 8/2009 | Milas | |
| 2009/0300174 A1 | 12/2009 | Floris | |
| 2010/0023454 A1 | 1/2010 | Exton | |
| 2010/0023703 A1 | 1/2010 | Christie | |
| 2010/0037311 A1 | 2/2010 | He | |
| 2010/0199325 A1 | 8/2010 | Raleigh | |
| 2010/0216429 A1 | 8/2010 | Mahajan | |
| 2010/0250370 A1 | 9/2010 | Jones et al. | |
| 2011/0055890 A1 | 3/2011 | Gaulin | |
| 2011/0063098 A1 | 3/2011 | Fischer | |
| 2011/0077758 A1 | 3/2011 | Tran | |
| 2011/0154034 A1 | 6/2011 | Bailey, Jr. | |
| 2011/0173108 A1 | 7/2011 | Rjasekar | |
| 2011/0173122 A1 | 7/2011 | Singhal | |
| 2011/0251958 A1 | 10/2011 | Aubin | |
| 2011/0258692 A1 | 10/2011 | Morrison | |
| 2011/0270751 A1 | 11/2011 | Csinger | |
| 2012/0030731 A1 | 2/2012 | Bhargava | |
| 2012/0129450 A1 | 5/2012 | Lee | |
| 2012/0197743 A1 | 8/2012 | Grigg | |
| 2012/0204032 A1* | 8/2012 | Wilkins | H04L 63/0428 713/170 |
| 2012/0214516 A1 | 8/2012 | Rosenberg | |
| 2012/0216012 A1 | 8/2012 | Vorbach et al. | |
| 2012/0270523 A1 | 10/2012 | Laudermilch | |
| 2012/0323596 A1 | 12/2012 | Verhulst | |
| 2012/0323717 A1 | 12/2012 | Kirsch | |
| 2013/0029653 A1 | 1/2013 | Baker et al. | |
| 2013/0080411 A1 | 3/2013 | Rolia | |
| 2013/0125099 A1 | 5/2013 | Budiu | |
| 2013/0130650 A1 | 5/2013 | Cheung | |
| 2013/0145429 A1 | 6/2013 | Mendel | |
| 2013/0212022 A1 | 8/2013 | Lanc | |
| 2013/0253942 A1 | 9/2013 | Liu et al. | |
| 2013/0275746 A1 | 10/2013 | Galdwin | |
| 2013/0298664 A1 | 11/2013 | Gillette, II | |
| 2014/0007193 A1 | 1/2014 | Qureshi | |
| 2014/0013112 A1 | 1/2014 | Cidon | |
| 2014/0096186 A1 | 4/2014 | Barton | |
| 2014/0115659 A1 | 4/2014 | Attfield et al. | |
| 2014/0143089 A1 | 5/2014 | Campos | |
| 2014/0173700 A1 | 6/2014 | Awan | |
| 2014/0195425 A1 | 7/2014 | Campos | |
| 2014/0279474 A1 | 9/2014 | Evan | |
| 2014/0379361 A1 | 12/2014 | Mahakar | |
| 2015/0227925 A1 | 8/2015 | Filler | |
| 2015/0278810 A1 | 10/2015 | Ramatchandirane | |
| 2015/0302409 A1 | 10/2015 | Malek | |
| 2015/0312277 A1 | 10/2015 | Rane et al. | |
| 2015/0334133 A1 | 11/2015 | Schaffner et al. | |
| 2015/0350254 A1 | 12/2015 | Hendrick et al. | |
| 2015/0358822 A1 | 12/2015 | Hendrick et al. | |
| 2016/0012216 A1 | 1/2016 | Attfield et al. | |
| 2016/0314296 A1 | 10/2016 | Attfield et al. | |
| 2017/0048714 A1 | 2/2017 | Attfield et al. | |
| 2017/0244759 A1 | 8/2017 | Attfield et al. | |

FOREIGN PATENT DOCUMENTS

| | | | | |
|---|---|---|---|---|
| JP | 2017529786 A | * | 12/2015 | G06Q 30/00 |
| WO | PCT/US06/017123 | | 1/2008 | |
| WO | PCT/US08/009313 | | 2/2009 | |
| WO | WO2015/026389 | | 2/2015 | |
| WO | PCT/US15/24932 | | 4/2015 | |
| WO | PCT/US15/27561 | | 4/2015 | |
| WO | PCT/US14/70897 | | 12/2015 | |
| WO | PCT/US15/048526 | | 3/2016 | |
| WO | PCT/US16/28481 | | 10/2016 | |
| WO | PCT/US16/032502 | | 11/2016 | |
| WO | PCT/US16/029144 | | 2/2017 | |

OTHER PUBLICATIONS

"Computer Networks", Tanenbaum, A. Andrew and Wetherall, D., 5th Ed. Prentice Hall (2010).
"Prolog Programming: A First Course", Brna, P. (Mar. 5, 2001). Retrieved from <http://homepages.inf.ed.ac.ud/pbma/prolog book/> on Mar. 16, 2013.
NFC Forum (2007), "Near Field Communication and the NFC Forum: The Keys to Truly Interoperable Communications" (PDF), http://www.nfc-forum.org, retrieved Oct. 30, 2012.
Landt, Jeremy (2001), "Shrouds of Time: The history of RFID", AIM, Inc. pp. 5-7.
Bluetooth Special Interest Group website, "A Look at the Basics of Bluetooth Wireless Technology", http:www.bluetooth.com/Pages/Basics.aspx, retrieved Oct. 29, 2012.
See e.g. H. Schildt, C ++—The Complete Reference, 2nd edition, pp. 67-70 McGraw Hill, 1995, ISBN 0-07-882123-1.

(56) References Cited

OTHER PUBLICATIONS

K. Ashton, "That 'Internet of Things' Thing", RFID Journal Jun. 22, 2009 (available online as of Oct. 20, 2013 at http://www.rfidjournal.com/articles/view?4986).

T. White, Hadoop—The Definitive Guide, O'Reilly, 2009 978-0-596-52197-4.

Nakamoto, Satoshi. "Bitcoin: A peer-to-peer electronic cash system." Consulted Jan. 2012 (2008): 28. Obtained from http://www.cryptovest.co.ok/resources/Bitcoin%20paper%20 Original.pdf on Apr. 6, 2015.

Bitcoin, Inc. "What are multi-signature transactions?", Obtained from http://bitcoin.stackexchange.com/questions 3718/what-are-multi-signature-transactions on Apr. 6, 2015.

Verilog, http://www.verilog.comm/, accessed May 12, 2014.

L. Woods, ZS. Istvan, G. Alonzo Ibex(2014) An Intelligent Storage Engine with Support for Advanced SQL Off-loading. VLDB 2014k, Hangzhou, China, Sep. 2014.

University of British Columbia, Department of Electrical and Computer Engineering, http://www.ece.ubc.ca//~edc/379,an99/lecgureslec 13.pdf, accessed May 2014.

IEEE P 1076 Working Group. http://www.eda.org/twiki/bin/view.cgi/P1076, accessed May 12, 2014.

\* cited by examiner

SYSTEM AND METHODS FOR FACILITATING SECURE COMPUTING DEVICE CONTROL AND OPERATION

PRIORITY CLAIM

This non-provisional application claims priority to Provisional Patent Application Ser. No. 62/161,614, entitled "System and Methods for Facilitating Secure Computing Device Control and Operation" filed May 14, 2015.

TECHNICAL FIELD

The present invention relates to the technical fields of Computer Security, Software as a Service, Mobile Computing, Telecommunications, Digital Communications, and Computer Technology.

BACKGROUND OF THE INVENTION

With the rapid proliferation of network enabled computing devices (the so-called Internet of Things) along with ubiquitous mobile personal devices and conventional computing platforms, the importance of secure, reliable computing environments is paramount. Failure to properly implement security on these new network enabled devices does not only threaten the devices themselves but could be a vulnerability for entire networks. This is a critical problem.

Secure access, management, and control of computing devices with compact or otherwise constrained processing hardware and networking hardware such as those found in the Internet of Things presents a number of challenges. Such devices may be constantly exposed to malicious attacks via the internet and can be remote and physically difficult or time-consuming to access directly by the permitted device users and administrators.

Many developers of devices and services do not focus on security as a priority—they understandably focus on their device or service. Also, these devices tend to be computationally lightweight and therefore have limited resources with which to implement reliable security. What is needed is a security framework that operates as a service whereby application developers need only subscribe to the service to receive appropriate implementation of security policies pertaining to their products and services.

Developers of computer code for such devices would benefit from having secure computing tools and secure services available so as to assist them in the development of secure computing code for the operation and control of these devices. A set of basic services is therefore provided that such developers can confidently and securely utilize without having to take the time and trouble to implement such services themselves.

This invention discloses a system and method for facilitating secure services over the network (as a software-as-a-service (SaaS) model) that also solves the problem of simplifying implementations for application programmers who need to implement security but who may not have the requisite expertise to do so.

The following device service framework and service design is disclosed herein as a way to provide developers with pre-built secure computing tools and services. As a whole, the framework represents a "base platform" for operation, control, and updating of online devices. Individual components or services from the framework may in some cases also be incorporated into devices to facilitate or simplify device development.

DETAILED DESCRIPTION OF THE INVENTION

In the present invention, a secure framework is proposed for registering, managing, and operating computing services simply but securely. The framework is designed to facilitate access to secure services on network-connected computing devices and to simplify secure software development for such devices.

The system is a transport mechanism that establishes "file system" and "network" services based on functions that the client registers with the framework. The framework runs on both the client and the servers that supply services to the client (see FIG. 2). The client issues "commands" to the server that name a service to be provided by the server and also provide any arguments that are required for that service. This can be accomplished either by a naming scheme whereby the client knows what services and commands are available, or by a discovery protocol so that it can be further extensible at run time.

Figure 2:
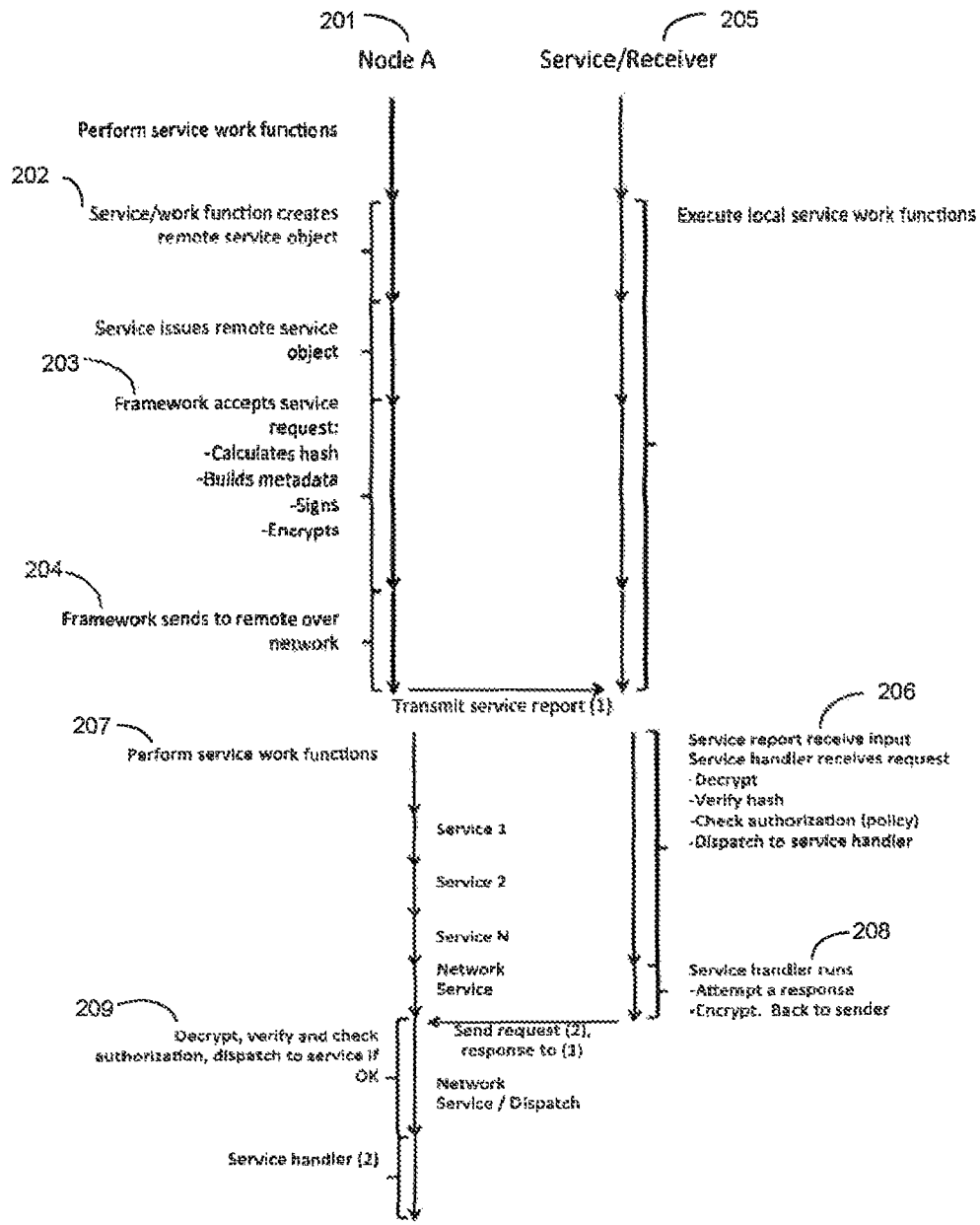
FIG. 2 Flow diagram showing a hypothetical client and server framework response to security service requests.

The system can be further abstracted where an aggregator can be used to aggregate commands from individual components in the client without having to know the structure of the client itself. In FIG. 2, the Service/Receiver (205) is one such aggregator. The aggregator can handle requesting services and delivering responses back to the client components as needed. This is useful because it relieves client components from having to handle their own interface to security services.

On initialization, the framework runs in a loop whereby it executes "work" functions. Within the work functions in the loop, the framework constructs and sends commands and then receives responses. The client (designated as Node A, 201) creates remote service objects (202) that include the named service and command as well as arguments. This is useful because it allows the security services to run remotely or on the same hardware as the device if that is desired. The system then hashes, signs and encrypts the service call (203) and it is sent to the server for processing (204). Each request for services has a transaction number so that the calling client can track outstanding requests while it continues to compute.

The receiver (205), then authenticates, authorizes, and decrypts the service call (206) before it is dispatched for processing to the service handler. The receiver conducts a policy check to ensure that execution of the command is allowed for this client. If not allowed, a return message is sent, otherwise, the service handler is called. The service handlers may be remote or may run on the same hardware as the aggregator. This is useful because the service handlers know they will only receive properly vetted requests. Only authorized commands can be executed.

At this point, the client and the service are operating asynchronously. The client is not halted at any time while it waits for a response from the server. Execution continues with local execution of services (207). When the service handler completes, the response is encrypted and returned to the sender with its associated transaction number for identification (208).

When the response is received by the client, it is decrypted, verified, and passed to the appropriate function while computation continues (209). At this point, the process can repeat itself as needed.

Figure 3:
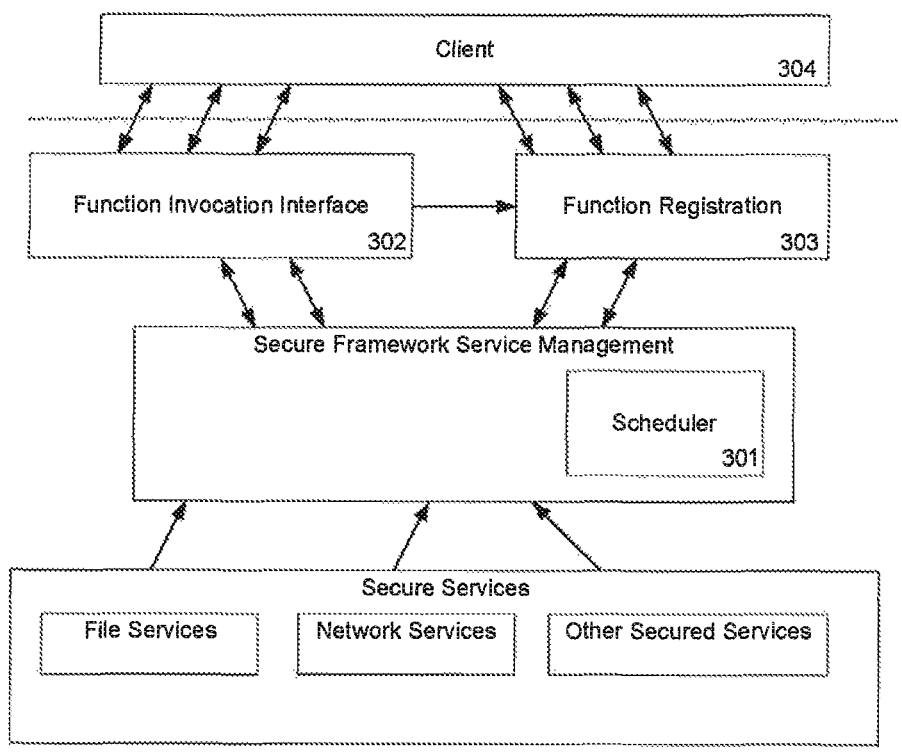
FIG. 3 Schematic diagram of the Secure Framework Service Architecture.

The following components, shown schematically in FIG. 3, are the core components of the framework:

Scheduler (301): This component handles the scheduling of the service handlers that perform the actual work functions for the client.

Function Invocation Interface (302): This component is the interface to the framework by which services are requested.

Registration mechanism for above (303) so that a client (304) can define services of their own.

Figure 1:
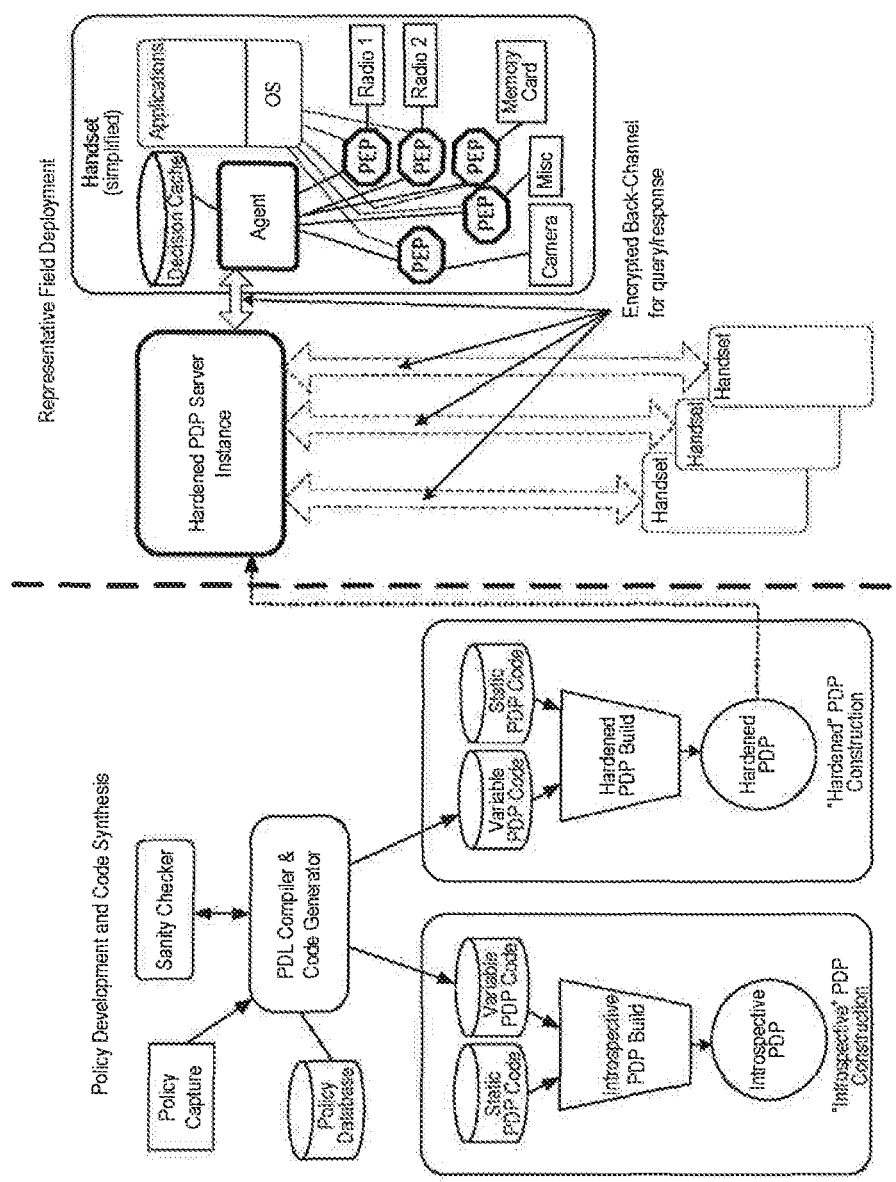
FIG. 1 Schematic representation of policy-based control system.

Abstraction of device specifics from the framework is accomplished via unix-like poll( ), ioctl( )and ioctl_completion( )functions, and other functions as required. However, in each case, policy-based control of each function call is provided by couplings to the policy-based system shown in FIG. 1, wherein each function or service invokes a Policy Decision Point (PDP) call to request a policy-based decision to allow or disallow the requested operation or take other appropriate action as specified by policy. In essence, each function or service in the framework incorporates or otherwise can invoke a Policy Enforcement Point (PEP). A service is defined by registering those functions with the framework (and giving each function a name). Services can then be targeted by remote endpoint for activity by invoking ioctl( )on the named services.

INDUSTRIAL APPLICATION

The invention disclosed herein is useful for any application domain where secure computing services are required but need not be executed or integrated into the local system directly. Mobile device applications are well suited to this invention because of their inherent lightweight computing capabilities and integrated networking. However, any computing application would benefit from the invention especially if the application developers want to "outsource" security to this service rather than implement it themselves.

What is claimed is:

1. A system for secure computing device control and operation to a requesting client from remote security and policy services, the system comprising:
the requesting client having a processor and a computer readable storage medium having data stored therein representing software executable by a computer, the software including instructions for:
identifying the remote security and policy services; and
connecting application code on the requesting client to service requests;
wherein the requesting client creates a service object from a service request that includes the name of the remote security and policy service and required parameters for said remote security and policy service;
the remote security and policy services coupled to the requesting client via a digital network, said remote security and policy services having a processor and a computer readable storage medium having data stored therein representing software executable by a computer, the software including instructions for:
receiving the service object and for extracting the service request from the service object;
adjudicating the service request at a polic decision point to execute the remote security and policy service; and
scheduling the execution of remote security and policy services; and
at least one policy execution point coupled to the requesting client to enforce the adjudicated service request and to take any other action as specified by the policy decision point.

2. The system of claim 1, wherein the requesting client software further includes instructions for:
hash encoding the service request;
digitally signing the encoded service request;
encrypting the signed and encoded service request;
decrypting the signed and encoded service request; and
hash verifying the hash encoded service request.

3. The system of claim 2 wherein the remote security and policy services software further includes instructions for receiving encoded, signed, and encrypted service requests from at least one requesting client and dispatching allowed requests to remote security and policy service providers.

4. The system of claim 3 wherein receiving encoded, signed. and encrypted service requests from at least one requesting client and dispatching allowed requests to remote security and policy service providers are executed on the requesting client processor.

5. The system of claim 1 wherein identifying the remote security and policy services uses a discovery protocol.

6. The system of claim 1 wherein the remote security and policy services and the requesting client are executed on the same processor.

7. The system of claim 1 wherein each service request is assigned a unique transaction number.

8. The system of claim I wherein the remote security and policy services further include:
a policy object language compiler and generator for specifying policy rules for the policy decision point.

9. A method for secure computing device control and operation to a requesting client from remote security and policy services, the steps comprising:
creating a service object for a service request that includes the name of the remote security and policy service and the required parameters for said remote security and policy service;
transmitting the service object to the remote security and policy service;
receiving the service object at the remote security and policy service;
extracting the service request from the service object;
adjudicating the service request to execute the remote security and policy service by invoking a policy decision point call to allow or disallow said service request;
transmitting the adjudicated service request to a policy enforcement point that enforces the adjudicated service request and takes any other action as specified by the policy decision point;
dispatching the service request to a remote service handler for processing;
executing the service request at the remote service handler;
generating a response at the remote service handler;
dispatching the response from the remote service handler to the remote security and policy services;
receiving the response from the remote service handler by the remote security and policy services; and transmitting the response back to the requesting client.

10. The method of claim 9 further including the steps:

calculating a hash encoding of the service object at the requesting client;

digitally signing the hash encoded service object;

encrypting the hash encoded and signed service object prior to transmission to the remote security and policy service;

decrypting the service object at the remote security and policy service;

verifying the hash encoding of the service object prior to authorizing the execution of the remote security and policy service; and encrypting the response returned from the remote security and policy service prior to transmitting back to the requesting client.

11. The method of claim 9 further including the step connecting application code on the requesting client to service requests via a function invocation interface prior to creating the service object.

12. The method of claim 9 further including the step identifying and accessing the security and policy services that are defined by the requesting client via a function registration.

13. The method of claim 9 further including the step identifying and accessing the security and policy services that are defined by the requesting client via a discovery protocol.

14. The method of claim 9 further including the step assigning a unique transaction number to each service request prior to transmitting the service object.

15. The method of claim 9 further including the step compiling policy rules for the policy decision point using a policy object language compiler and generator.

* * * * *